7970X
Hotchkiss & Garnsey,
Snap Hook.
Patented Jan. 23, 1834.
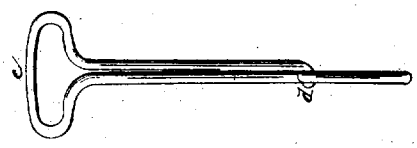
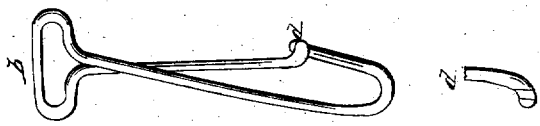
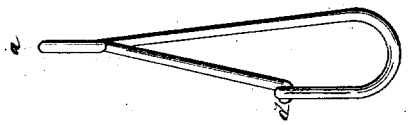
N. PETERS, PHOTO-LITHOGRAPHER, WASHINGTON, D. C.

7970X 195

Jan. 23. 1834

Asahel A Hotchkiss and Ebenezer Garnsey
Letters Patent

The Schedule referred to in these Letters Patent and making part of the same containing a description in the words of the said Asahel A Hotchkiss and Ebenezer Garnsey themselves of their improvement entitled Hotchkiss and Garnsey's Hook for Bit and Harness.

Be it Known that We Asahel A Hotchkiss and Ebenezer Garnsey, both of Sharon in the County of Litchfield and State of Connecticut have made an improvement in the useful arts being a hook or apparatus for fastening the reins to the bits of ... Bridles and fastening together the several parts of harness without the use of buckles, hooks or other fastenings now in use. entitled "Hotchkiss and Garnsey's hook for bits and Harness which is described as follows. The common mode or that sometimes used for attaching the reins to the bits is by means of a hook having a strap or shank with an opening at one end and a hook at the other, and a spring fastened on, the shank passing under the hook consisting of two or more pieces of metal. My improved hook is made of one piece of Steel, brass or other wire, bent in this shape 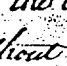 one end of which is attached to the reins, or harness, and the other or hook end to the bridle bits or other parts of the harness, one end serving as the hook and the other as a spring passing under it and pressing lightly against it so as to prevent the bits ~~from~~ slipping out of it The advantages of this hook or fastening is cheapness and perfect security. — What we claim as our Invention and desire to be secured by Letters Patent, is making hooks for fastening Bridle reins to the bits and other parts of the harness by means of a bent wire hook made of one piece of metal instead of two or more pieces.

Witnesses
Israel Camp
Richard Smith

Asahel A Hotchkiss
Ebenezer Garnsey

Exd
W.C.

(420 words) (Patented 23 Jany 1834)